United States Patent [19]

Kaley et al.

[11] 4,139,208
[45] Feb. 13, 1979

[54] MULTIPURPOSE LIGHT CART

[76] Inventors: George Kaley; Bernadette Kaley, both of 736 Oak Ave., River Edge, N.J. 07661

[21] Appl. No.: 814,701

[22] Filed: Sep. 12, 1977

[51] Int. Cl.² ............................................. B62B 13/18
[52] U.S. Cl. ........................................................... 280/9
[58] Field of Search ...................... 280/9, 10, 11, 639, 280/656, 79.3, 20; 296/27

[56] References Cited

U.S. PATENT DOCUMENTS

| | | | |
|---|---|---|---|
| 628,295 | 7/1899 | Anderson | 296/27 |
| 630,987 | 8/1899 | Nylander | 280/11 |
| 1,521,944 | 1/1925 | Hague | 280/9 |
| 2,615,724 | 10/1952 | Lee | 280/20 |
| 2,768,022 | 10/1956 | Pope | 296/27 |

Primary Examiner—Robert R. Song
Attorney, Agent, or Firm—Howard I. Podell

[57] ABSTRACT

A cart mounted on two inverted "T" shape runners with wheels collapsibly mounted between the runners and actuated by levers on each side of the cart. The cart has foldable front and rear sides. The wheels are mounted on spaced plates and have means for locking them in raised and lowered positions.

1 Claim, 3 Drawing Figures

U.S. Patent
Feb. 13, 1979
4,139,208
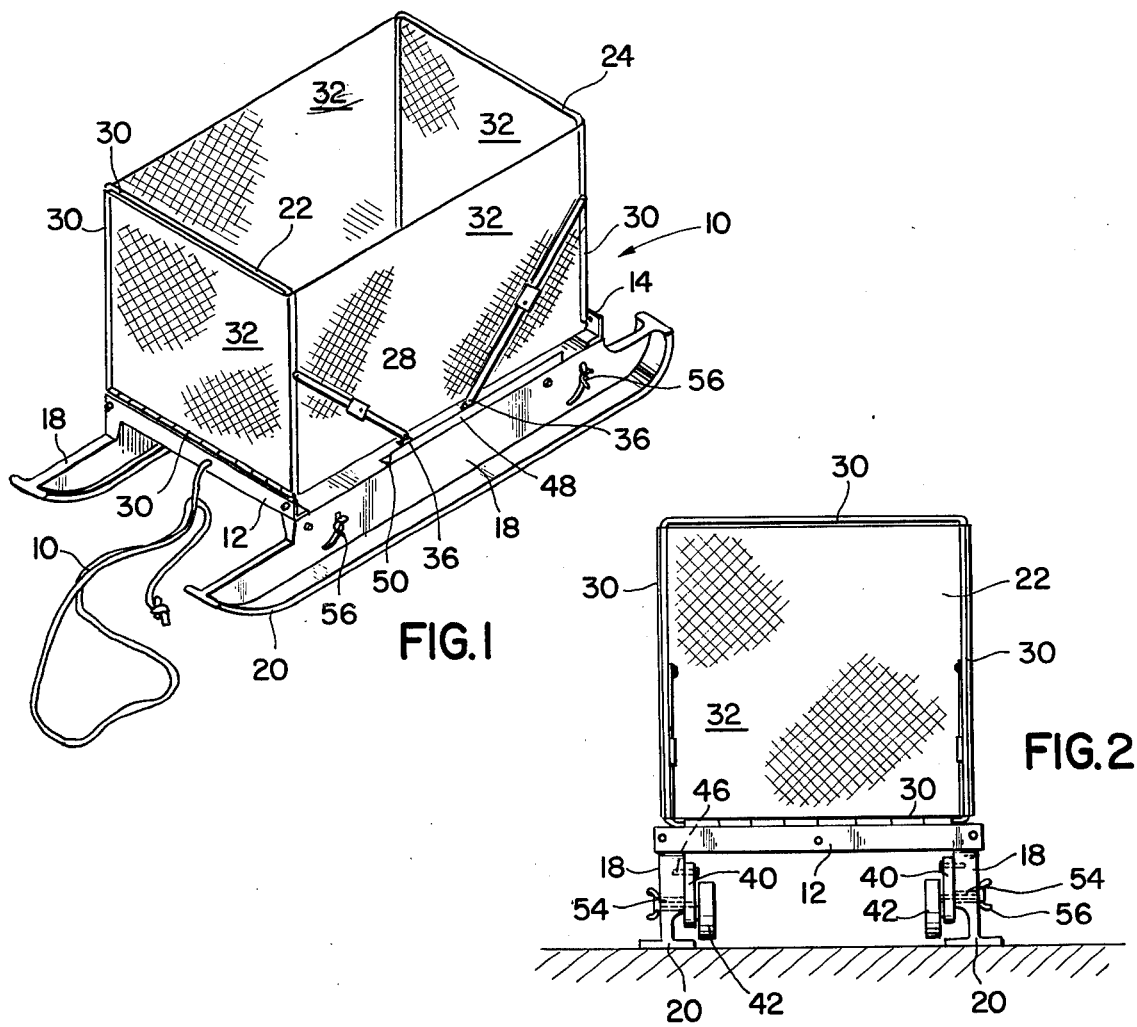
FIG. 1
FIG. 2
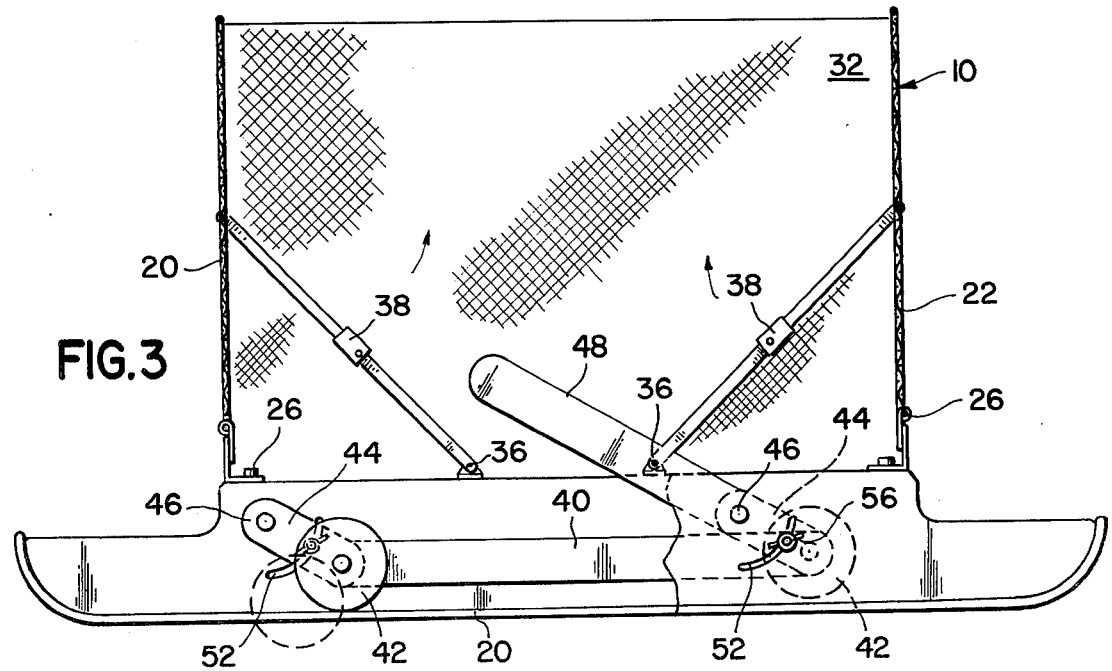
FIG. 3

MULTIPURPOSE LIGHT CART

FIELD OF THE INVENTION

This invention relates to a novel cart for moving loads over hard and soft surfaces.

The principal object of this invention is to provide a cart of this type which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

BRIEF DESCRIPTION OF THE DRAWING

In the accompanying drawing, in which is shown one of the various possible illustrative embodiments of this invention, wherein like reference character identify the same or like parts:

FIG. 1 is a perspective view showing one embodiment of a cart in accordance with the invention;

FIG. 2 is a front view of the cart; and

FIG. 3 is a side view showing in dotted lines the wheel assembly in raised position.

DESCRIPTION OF THE PREFERRED EMBODIMENT

With reference to the drawing, there is shown and illustrated a cart constructed in accordance with the principles of the invention and designated generally by reference character 10.

As shown the cart includes front and back frame members 12 and 14 fastened by bolts 16 to the upper part of inverted "T" shaped runners 18 whose lower surface 20 is adapted to slide on snow in the manner of a ski.

Front and back side members 22 and 24 are hinged to the frame by hinges 26 so arranged as to allow members 22 and 24 to fold on the floor 28 of cart. Members 22 and 24 consist of 4 metal uprights 30 outside of which is secured on 4 sides a wire of fabric mesh material 32 forming a load compartment foldable over the floor 28 of the cart when no load is being carried. The compartment is secured in operative position by a pair of oblique struts 34 pivoted at one end to the upper part of the runners at 36 and to the midpoints of uprights 30. Struts 34 each consist of two parts pivoted at their midpoints 38 so as to cause collapse of hinged members 20 and 22 when pulled upwardly in the direction of the arrows in FIG. 3.

FIGS. 2 and 3 show a pair of wheel trains on which are journalled two wheels which are retractably mounted on the inside surface of the runners to allow the cart 10 to roll when required.

Each wheel train includes a longitudinal plate 40 having a wheel 42 mounted on an axle to which is also mounted the lower part of bracket 44. The upper part of each bracket 44 is pivoted to the upper part of the runners on pivot 46 on which is also mounted control lever 48 received in recess 50 in each runner when the wheels are retracted as shown in FIG. 2.

Referring again to FIG. 2 locking means are provided to lock the wheel train in place. Such means include a curved opening 52 in each runner above each wheel through which passes screw 54 extending from plate 40 to be tightened by wing nut 56 to lock the wheel train in raised or lowered position.

The wire or fabric mesh can be secured to the uprights by an hook and eye arrangement.

To facilitate pulling the cart, a rope 60 is secured to the frame member 12.

The operation and use of the cart hereinabove described will be evident to those skilled in the art to which it relates from a consideration of the foregoing.

It will thus be seen that there is provided a load-carrying cart in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A cart comprising a collapsible load compartment, a pair of spaced ski-like runners fixed to said compartment; a wheel train retractable mounted on each runner; means on said runners for raising and lowering said wheel train to convert said cart to a rolling vehicle and locking means operatively associated with said runners and said trains to lock said trains in lowered and raised positions, wherein said locking means comprise an opening in each runner and a bolt secured to each train passing through said opening and a nut threaded on said bolt and tightenable against the outside of each runner.

* * * * *